(12) United States Patent
Mahlich

(10) Patent No.: US 9,061,737 B2
(45) Date of Patent: Jun. 23, 2015

(54) VERTICAL GLIDE MOORING SYSTEM

(71) Applicant: Ken Mahlich, Sheffield Lake, OH (US)

(72) Inventor: Ken Mahlich, Sheffield Lake, OH (US)

( * ) Notice: Subject to any disclaimer, the term of this patent is extended or adjusted under 35 U.S.C. 154(b) by 32 days.

(21) Appl. No.: 13/918,939

(22) Filed: Jun. 15, 2013

(65) Prior Publication Data

US 2014/0366793 A1 Dec. 18, 2014

(51) Int. Cl.
*B63B 21/04* (2006.01)
*B63B 21/00* (2006.01)

(52) U.S. Cl.
CPC ............... *B63B 21/04* (2013.01); *B63B 21/00* (2013.01)

(58) Field of Classification Search
CPC ............................. B63B 21/00; B63B 21/04
USPC ......................... 114/230.16, 230.27
See application file for complete search history.

(56) References Cited

U.S. PATENT DOCUMENTS

| | | | |
|---|---|---|---|
| 2,844,943 A * | 7/1958 | Kennedy | 405/213 |
| 2,873,712 A | 2/1959 | Gossen | |
| 3,145,685 A * | 8/1964 | Kulick, Sr. | 114/220 |
| 4,062,313 A | 12/1977 | Stram | |
| 4,066,030 A | 1/1978 | Milone | |
| 4,127,005 A | 11/1978 | Osborne | |
| 4,480,576 A * | 11/1984 | Mills | 114/230.27 |
| 4,697,538 A * | 10/1987 | Day | 114/230.16 |
| 5,007,363 A * | 4/1991 | James | 114/219 |
| 5,014,638 A * | 5/1991 | Ilves et al. | 114/230.18 |
| 5,050,521 A | 9/1991 | Stone | |
| 5,138,965 A * | 8/1992 | Culp | 114/230.16 |
| 5,150,744 A | 9/1992 | Hayashi | |
| 5,184,562 A | 2/1993 | Hallin | |
| 5,265,553 A | 11/1993 | Brydges | |
| 5,301,528 A | 4/1994 | Hofmann | |
| 5,301,628 A * | 4/1994 | Daskalides | 114/230.27 |
| 5,341,757 A * | 8/1994 | Digiacomo | 114/230.27 |
| 5,493,991 A * | 2/1996 | Wright et al. | 114/230.27 |
| 5,603,280 A * | 2/1997 | Shackelford, Jr. | 114/230.27 |
| 5,762,016 A * | 6/1998 | Parsons | 114/219 |
| 6,216,625 B1 * | 4/2001 | Baluha | 114/230.27 |
| 6,595,153 B2 * | 7/2003 | Booth et al. | 114/230.1 |
| 7,028,630 B2 * | 4/2006 | Metz | 114/230.16 |
| 7,213,526 B1 * | 5/2007 | Hamilton | 114/44 |
| 7,322,307 B1 * | 1/2008 | Perry | 114/219 |
| 8,025,019 B1 * | 9/2011 | Katulka | 114/220 |
| 8,267,620 B2 * | 9/2012 | Wood et al. | 405/3 |
| 8,291,846 B2 * | 10/2012 | Bender | 114/219 |
| 8,499,710 B2 * | 8/2013 | Marshall | 114/230.22 |

* cited by examiner

*Primary Examiner* — Lars A Olson
*Assistant Examiner* — Jovon Hayes

(57) ABSTRACT

A system adapted to position a floating object having a slide assembly with a contact surface, the floating object selectively engaging the contact surface, a track operatively connected to the slide assembly, and a locking mechanism secured to the slide assembly, the locking mechanism having a plug at one end.

4 Claims, 4 Drawing Sheets

VERTICAL GLIDE MOORING SYSTEM

BACKGROUND OF THE INVENTION

Boat owners regularly need to moor their water crafts to docks. Proper mooring allows for optimal storage and loading and unloading of the boat's contents and passengers.

Existing means for boat mooring are less than ideal. Despite the best intent of boat owners and dock workers, boats can still become damaged with current approaches. Current attempts to optimize mooring have been largely unsuccessful. There remains a long-felt and unmet need for a suitable means of creating a system or device for mooring a water craft.

SUMMARY OF INVENTION

Figure 1:
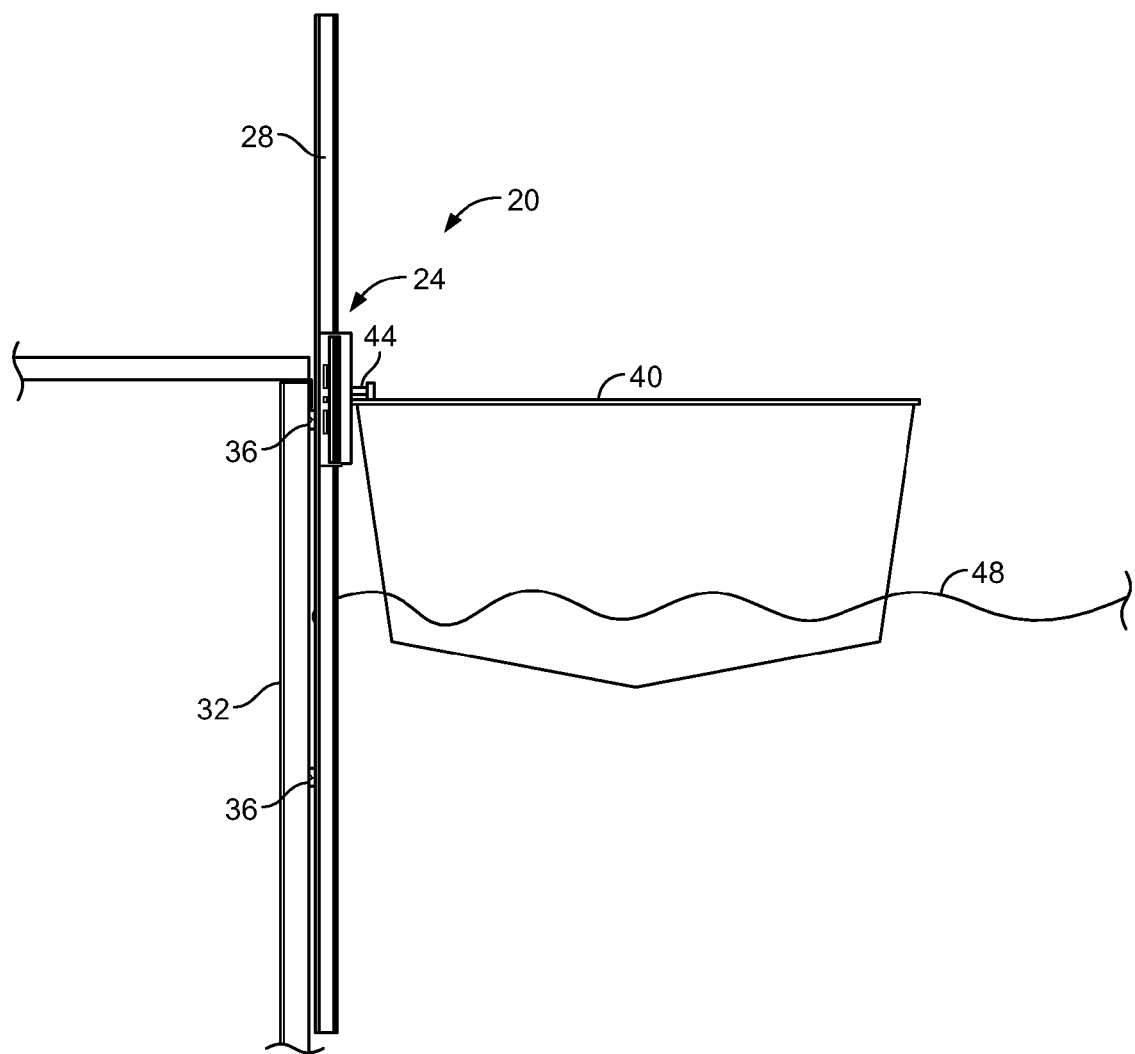
FIG. 1 is an elevation view of the vertical glide mooring system in accordance with an embodiment of the present invention.

There is provided a track that may be secured to a dock, landmass, or wharf to which provides a means to moor a vessel. The track may be mounted in a generally vertical orientation and may provide a means to moor a vessel to the dock within a wide and changeable range of water levels at the dock. The track may be mounted in multiple locations to the dock such that it cooperates with the cleats on the vessel gunwales, or other suitable portion.

There is also provided a selectively movable glide member to traverse the vertical track. The glide member may have a plurality of cleats mounted to the sides of the glide to provide a means to moor a vessel to the glide via a rope. There is also a mechanical device mounted to the glide member that enables to the glide member to be selectively locked into a location to match the height location of the cleat on the vessel for mooring. The locking mechanism can be selectively locked in various locations along the track. This enables the glide member for ready access to be moored to the vessel. The vessel may be moored tightly to the glide member to reduce horizontal motion of the vessel, while allowing the vessel to adjust to the water level at the dock.

DETAILED DESCRIPTION OF THE INVENTION

Preliminarily, it should be noted that certain terms used herein, such as for example, top, bottom, above, below, upper, lower, left and right, are used to facilitate the description of the invention. Unless otherwise specified or made apparent by the context of the discussion, such terms and other directional terms, such as for example top or bottom, should be interpreted with reference to the figure(s) under discussion. Such terms are not intended as a limitation on the position in which the invention or components may be used. Indeed, it is contemplated that the components of the invention may be positioned in more than one orientation for use. Likewise, numerical terms such as for example "first", and "second" are not intended as a limitation or to imply a sequence, unless otherwise specified or made apparent by the context of the discussion. The term "operatively connected" is understood to include a linking together of the portions under consideration and may include a physical engagement and/or a functional or operational connection.

The term "angle" as used in this application may be understood to include, but is not limited to, any structure or functionality which defines or creates a corner. The corner may constitute a projecting part or an enclosed or partially enclosed space. The corner may be generally straight, generally curved or arced—or partially straight or curved. The term "angle" may also include the space between two lines or surfaces at or near the point at which they touch or intersect.

The term "track" may include, but is not limited to, any structure or functionality which provides a rail along which another structure may generally ride or glide.

The term "plug" may include, but is not limited to, any structure or functionality which obstructs or impairs passage.

The term "mooring" may include, but is not limited to, any structure or functionality which generally holds secure an object by means of cables, anchors, lines or the like.

The term "cushion" may include, but is not limited to, any structure or functionality which generally softens the hardness or angularity of a structure.

The term "housing" may include, but is not limited to, any structure or functionality which generally serves as a frame, bracket, or box for holding or protecting one or more mechanical parts.

The term "resilient" may include, but is not limited to, any structure or functionality which generally tends to recover a previous form from, or adjust easily to, change in shape.

The term "rope" may include, but is not limited to, any structure or functionality which generally includes a cord of twisted or braided strands of hemp, flax, cotton, wire, line or the like. The rope may include a wide varieties of lines.

The term "fluid" may include, but is not limited to, a substance having particles that easily move and change their relative position generally without a separation of the mass and that generally easily yield to pressure. It will be appreciated that fluids are generally capable of flowing. Nonlimiting examples of fluids include liquids and gases, including water, air, hydraulic fluids, and the like. A substance may be considered a fluid even though solid particles are entrained therein.

Referring now to the drawings, there is illustrated in FIGS. 1 through 4 a vertical glide mooring system, indicated generally at 20, according to the invention. To facilitate reading, the shorter term "system 20" may be employed in place of the longer term "vertical glide mooring system 20" where appropriate. The system 20 is operative to optimally position a floating object.

The term "support" may include [but is not limited to] one or more structures or components adapted to generally hold up, serve as a foundation for, and/or prop up something.

The term "adjacent" may include [but is not limited to] structures or components situated generally near or generally close to each other, which may or may not be touching and/or connected.

The term "notched" may include, but is not limited to, structures or components generally having an indentation therein.

The term "glide" may include, but is not limited to, movement of structures or components that move or slide in a generally smooth manner.

The term "axis" as used in this application may be understood to include, but is not limited to, a generally straight line about which a body or a geometric figure rotates or may be supposed to rotate. The "axis" may be a generally straight line with respect to which a body, component, or figure may be generally symmetrical. The "axis" may be a reference line of a coordinate system.

These definitions are provided solely to facilitate an understanding of the invention—not to limit the invention.

The system 20 as shown includes a slide assembly 24 slidably engaged to the track 28. The track 28 shown includes an I-beam profile. The slide assembly 24 is a glide member and is selectively moveable. The track 28 is shown secured to the dock 32 by a pair of mounting bolts 36. Other means for securing the track 28 may be employed as desired. The slide assembly 24 and track 28 and dock 32 are operatively connected. The track 28 is shown generally perpendicular to the water level 48. The water level is a line of fluid, which may generally rise or fall with lunar tides or other conditions which impact waves in fluid. The track 28 shown has an I-shaped cross sectional shape.

The vessel 40 is shown in FIG. 1 operatively connected to the slide assembly 24 of the system 20 by a section of rope 44. The rope is a line. The vessel 40 is shown as a boat and may be any suitable type of vehicle or craft. A portion of the vessel 40 is shown above the water level 48. A portion of the vessel 40 is shown below the water level 48. The system 20 is operative to selectively restrict movement of the vessel 40 both generally vertically and generally horizontally with respect to the dock 32 and water level 48.

Figure 2:
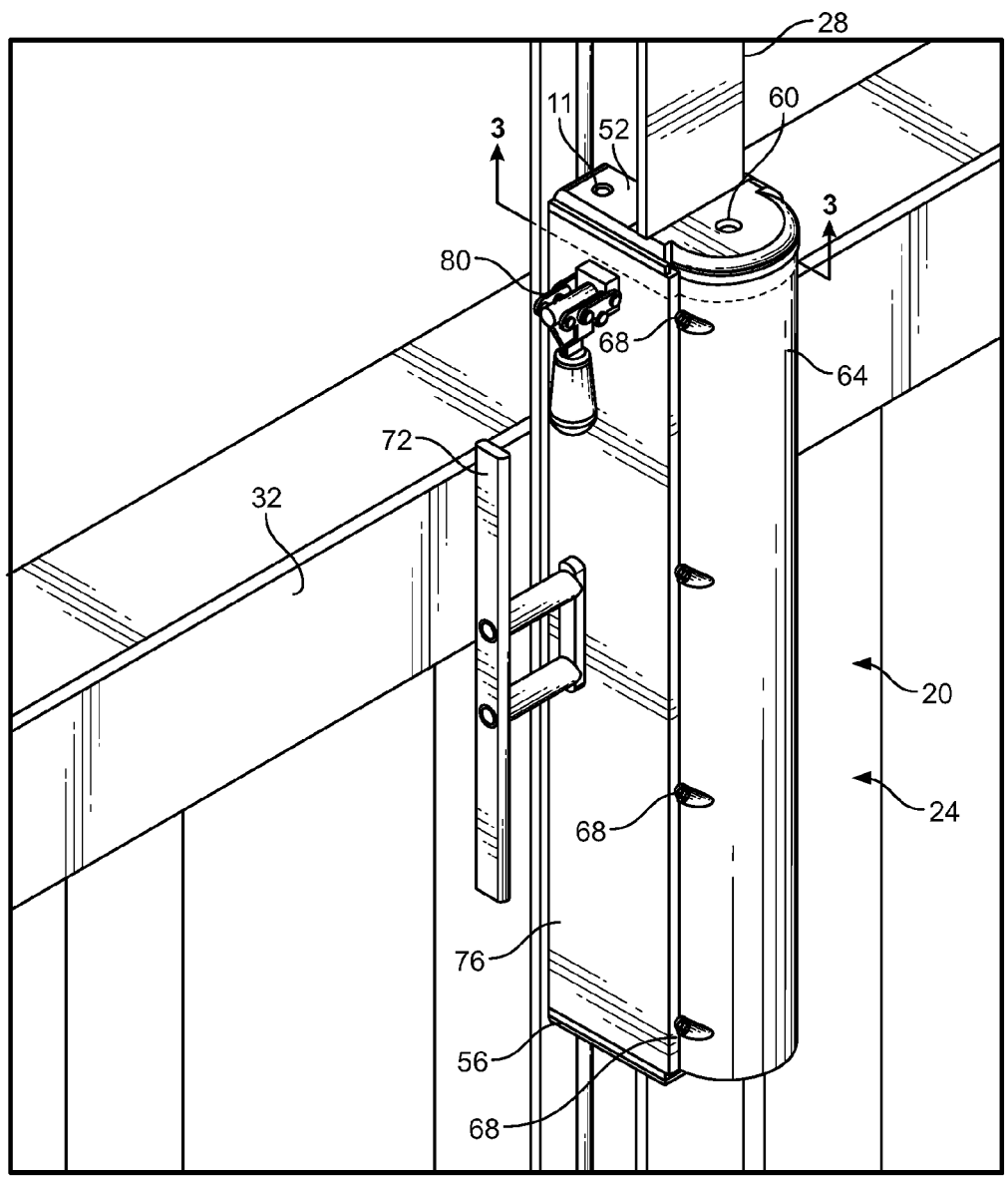
FIG. 2 is a perspective view of the vertical glide mooring system of FIG. 1 with a locking mechanism in an unlocked position.

Referring now primarily to FIG. 2, the slide assembly 24 of the system 20 may include a first end cap 52 and a second end cap 56. The first end cap 52 and the second end cap 56 generally enclose the slide assembly 24 and assist in protection from the elements of weather. The first end cap 52 is shown secured to the slide assembly 24 with an end cap bolt 60. When oriented as shown, the first end cap 52 is an upper end cap and the second end cap 56 is a lower end cap.

The cushion 64 of the slide assembly 24 is shown secured by a plurality of cushion mounting screws 68. In operation, the cushion 64 serves to provide a contact surface for the boat 40. Two cleats 72a, 72b are provided on respective sides of the slide assembly 24. The cleats 72a, 72b are fittings located on the slide assembly 24 to selectively allow the vessel 40 to be operatively connected to the dock 32 by the rope 44. A housing 76 is shown and provided to protect other components of the slide assembly 24. The locking mechanism 80 is shown secured to the housing 76 of the slide assembly 24.

Figure 3:
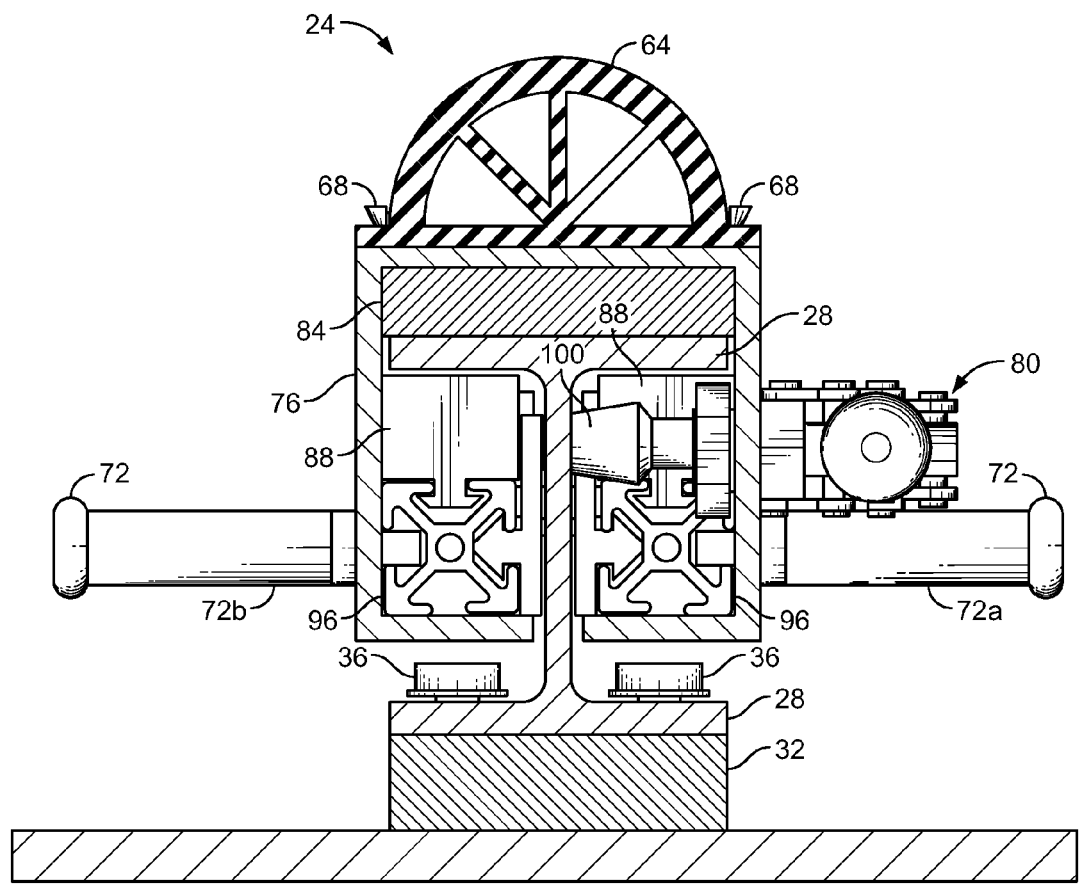
FIG. 3 is a cross sectional top view as seen along line 3-3 on FIG. 2 of the vertical glide mooring system of FIG. 1 in a locked position.

Referring now primarily to FIG. 3, the slide assembly 24 shown includes a first glide support 84. The first glide support 84 is a front facing glide support in the sense that the cushion 64 is positioned at the front part of the slide assembly 24. The first glide support 84 is located on the interior of the housing 76. The slide assembly 24 shown also includes a pair of second glide supports 88. The second glide support 88 is a rear-facing glide support in the sense that the rear of the slide assembly 24 is adjacent to the dock 32. The slide assembly 24 shown also includes a pair of inner glide supports 92. The inner glide supports 92 are shown spaced apart from the track 28. The slide assembly 24 shown also includes a pair of third supports 96. The third supports 96 are glide supports provided at the rear of the slide assembly 24 and may be viewed as rear supports. The third supports 96 shown are notched and include an x-shaped cross-sectional profile.

The slide assembly 24 shown also includes a plug 100. The plug 100 is located at a terminus of the locking mechanism 80. The plug 100 is shown in contact with the track 28 in FIG. 3. The locking mechanism 80 is shown in the locked position in FIG. 3. The plug 100 may be made of rubber or other suitable resilient material.

Figure 4:
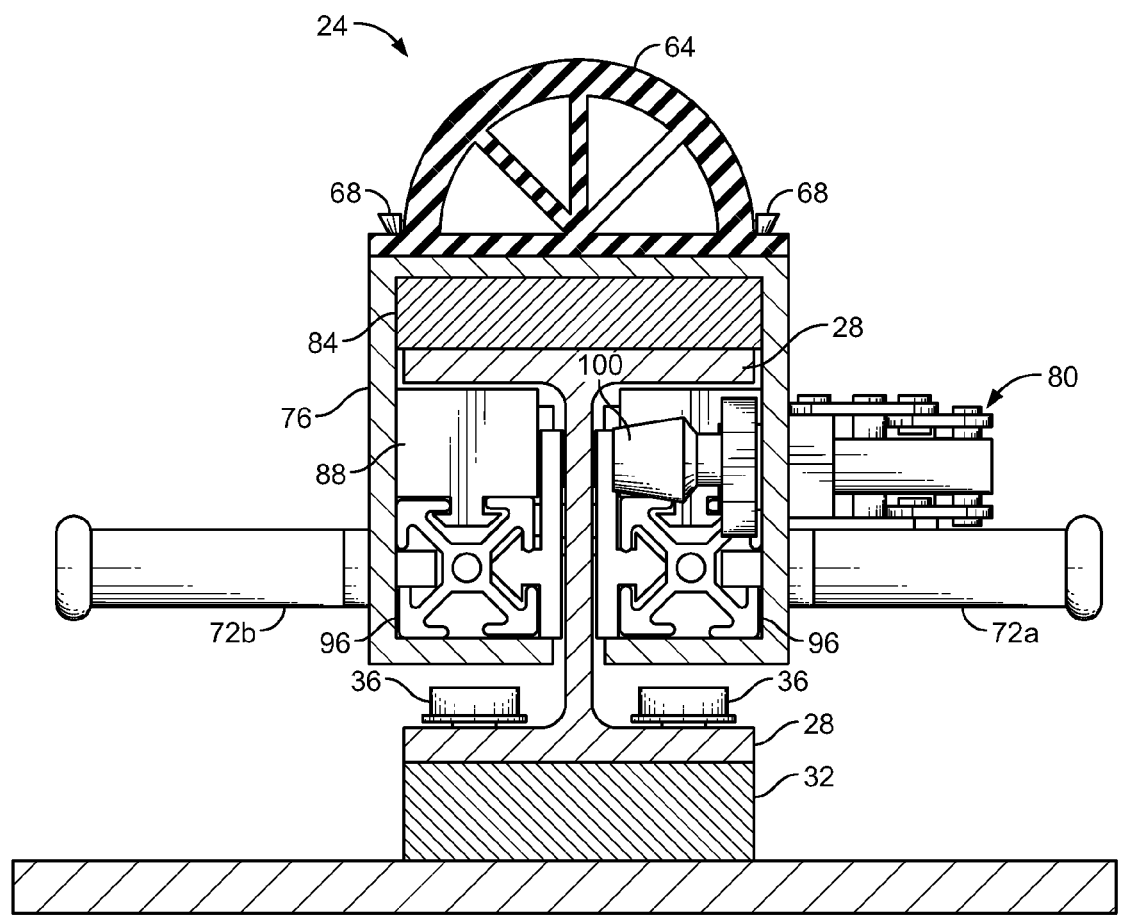
FIG. 4 is a cross sectional bottom view of the vertical glide mooring system of FIG. 1 in an unlocked position, as seen along line 3-3 on FIG. 2.

The plug 100 is shown spaced-apart from the track 28 in FIG. 4. The locking mechanism 80 is shown in an unlocked position in FIG. 4.

The disclosure herein includes a track that may be secured to a dock, landmass, or wharf to which provides a means to moor a vessel. The track may be mounted in a generally vertical orientation and may provide a means to moor a vessel to the dock within a wide and changeable range of water levels at the dock. The track may be mounted in multiple locations to the dock such that it cooperates with the cleats on the vessel gunwales, or other suitable portion.

The disclosure herein includes a glide member to traverse the vertical track. The glide member may have a plurality of cleats mounted to the sides of the glide to provide a means to moor a vessel to the glide via a rope. There is also a mechanical device mounted to the glide member that enables to the glide member to be selectively locked into a location to match the height location of the cleat on the vessel for mooring. The locking mechanism can be selectively locked in various locations along the track. This enables the glide member for ready access to be moored to the vessel. The vessel may be moored tightly to the glide member to reduce horizontal motion of the vessel, while allowing the vessel to adjust to the water level at the dock.

The track 28 and housing 76 may be made of corrosion-resistant structural aluminum alloy or other suitable materials.

The plug 100 may be adjustable to the locking mechanism 80 to provide sufficient pressure to the track 28 to hold the slide assembly 24 in selected position. This pressure may create a friction pressure to hold the slide assembly 24 in place while in operation. As the plug 100 may be adjustably moved away from the locking mechanism 80 and toward the track 28, the friction pressure is believed to increase to the point that the locking mechanism 80 may not properly engage and optimally lock into place with the track 28. The plug 100 may be adjusted into a closer position to the locking mechanism 80, thus decreasing the pressure below an amount needed to hold the slide assembly 24 in a position relative to the track 28. It should be noted that the increasing the pressure may create a fatigue force in the slide assembly 24.

The third supports 96 shown include an x-shaped cross-sectional profile operative to assist the slide assembly 24 to ensure tension on the rope 44 to the floating vessel 40. The "x" shape may be advantageous to mount the cleats 72 to the slide assembly 24 and secure position of the third supports 96. One or more of the cleats 72 and the third support 96 having the x-shaped cross-sectional are operatively connected.

The x-shaped cross-sectional profile is believed to provide strength by increasing the area of contact with the slide assembly 24. The slide assembly 24 may be made from a suitable friction-resistant material. The system 20 includes a gap between the track 28 and the glide supports 84, 88, 96. The gap may be selected as not more than the difference between the internal dimensional measurement of the housing 76 and the width of the track 28.

In operation, the system 20 may be adapted to moor the vessel 40 such as a boat to the dock 32. The locking mechanism 80 may be selectively engaged with the track 28 to reduce movement of the vessel 40. The system 20 operates to operatively connect the vessel 40 and the dock 32. The system 20 as shown includes the slide assembly 24 having a cushion 64 and the housing 76, the boat 40 selectively engaging the cushion 64. The system 20 as shown includes the track 28 operatively connected to the dock 32 via one or more bolts 36. The system 20 as shown includes the locking mechanism 80 with the plug 100. When the plug 100 contacts the track 28, the locking mechanism 80 being in a locked position as seen in FIG. 3, the slide assembly 24 is generally stationary—in a substantially fixed position. When the slide assembly 24 is generally stationary, not freely moving along the vertical axis, the movement of the boat 40 is substantially restricted in the vertical and horizontal directions.

Further, the system 20 may be adapted to moor a boat 40 to the dock comprising. The system 20 may include a generally stationary track 28 adapted for attachment with the dock 32. The slide assembly 24 is a generally movable member, slidably engaged to the track 28. The movable member may have a cushion 64 and a locking mechanism 80. The locking mechanism 80 may be movable between an unlocked position and a locked position and may have a plug 100. The cushion 64 selectively engages the boat 40 and the plug 100 selectively engages the track 28.

The system 20 is not limited to use with a boat. The system 20 may be adapted to position a wide variety of floating objects. The system 20 may include a slide assembly having a cushion, the floating object selectively engaging the cushion and a track operatively connected to the slide assembly. The system 20 may include a locking mechanism secured to the slide assembly, the locking mechanism having a plug at one end and the locking mechanism being movable between an unlocked position and a locked position. The slide assembly may be generally stationary relative to the floating object when the locking mechanism is in the locked position, with the plug generally contacting the track.

The invention may be made from any suitable materials and by any suitable methods. The invention may be adapted to fit a wide variety of uses. It will be appreciated that the components of the invention may be easily modified as needed to accommodate varying sizes and shapes.

It is to be understood that the invention is not limited in its application to the details of construction and to the arrangements of the components set forth in the accompanying description or illustrated in the drawings. The invention is capable of other embodiments and of being practiced and carried out in various ways. Also, it is to be understood that the phraseology and terminology employed herein are for the purpose of description and should not be regarded as limiting. The disclosure may readily be utilized as a basis for the designing of other structures, methods and systems for carrying out the present invention. It is important, therefore, that the claims be regarded as including equivalent constructions. Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract and disclosure are neither intended to define the invention of the application, which is measured by the claims, nor are they intended to be limiting as to the scope of the invention in any way.

What is claimed is:

1. A mooring system adapted to moor a boat to a dock comprising:
    A slide assembly having a cushion and a housing, the boat selectively engaging the cushion;
    a track operatively connected to the dock;
    a locking mechanism secured to the housing, the locking mechanism having a plug at one end and the locking mechanism being movable between an unlocked position and a locked position; and
    a plurality of glide supports operatively connected to the housing, the plurality of glide supports being spaced apart from the track, the plurality of glide supports including a glide support having an x-shaped cross sectional profile;
    wherein the slide assembly is generally stationary relative to the boat when the locking mechanism is in the locked position, with the plug generally contacting the track.

2. A mooring system adapted to moor a boat to a dock comprising:
    A slide assembly having a cushion and a housing, the boat selectively engaging the cushion;
    a track operatively connected to the dock;
    a locking mechanism secured to the housing, the locking mechanism having a plug at one end and the locking mechanism being movable between an unlocked position and a locked position;
    a plurality of glide supports operatively connected to the housing, the plurality of glide supports being spaced apart from the track, the plurality of glide supports including a glide support having an x-shaped cross sectional profile; and
    a cleat operatively connected to the glide support having an x-shaped cross sectional profile;
    wherein the slide assembly is generally stationary relative to the boat when the locking mechanism is in the locked position, with the plug generally contacting the track.

3. A system adapted to moor a boat to a dock comprising:
    a generally stationary track adapted for attachment with the dock;
    a generally movable member, slidably engaged to the track, the movable member having a cushion and a locking mechanism, the locking mechanism being movable between an unlocked position and a locked position and having a plug; and
    a plurality of glide supports operatively connected to the housing, the plurality of glide supports being spaced apart from the track, the plurality of glide supports including a glide support having an x-shaped cross sectional profile,
    wherein the cushion selectively engages the boat and the plug selectively engages the track.

4. A system adapted to position a floating object comprising:
    a slide assembly having a contact surface, the floating object selectively engaging the contact surface;
    a track operatively connected to the slide assembly;
    a locking mechanism secured to the slide assembly, the locking mechanism having a plug at one end and the locking mechanism being movable between an unlocked position and a locked position; and
    a plurality of glide supports operatively connected to the housing, the plurality of glide supports being spaced apart from the track, the plurality of glide supports including a glide support having an x-shaped cross sectional profile,
    wherein the slide assembly is generally stationary relative to the floating object when the locking mechanism is in the locked position, with the plug generally contacting the track.

* * * * *